United States Patent
Bos et al.

(10) Patent No.: US 9,906,368 B2
(45) Date of Patent: Feb. 27, 2018

(54) GENERAL ENCODING FUNCTIONS FOR MODULAR EXPONENTIATION ENCRYPTION SCHEMES

(71) Applicant: NXP B.V., Eindhoven (NL)

(72) Inventors: Joppe Bos, Leuven (BE); Michaël Peeters, Leuven (BE)

(73) Assignee: NXP B.V., Eindhoven (NL)

( * ) Notice: Subject to any disclaimer, the term of this patent is extended or adjusted under 35 U.S.C. 154(b) by 30 days.

(21) Appl. No.: 14/580,963

(22) Filed: Dec. 23, 2014

(65) Prior Publication Data

US 2016/0182235 A1 Jun. 23, 2016

(51) Int. Cl.
*H04L 9/32* (2006.01)
*H04L 9/14* (2006.01)

(52) U.S. Cl.
CPC .............. *H04L 9/3247* (2013.01); *H04L 9/14* (2013.01); *H04L 9/3249* (2013.01); *H04L 2209/24* (2013.01); *H04L 2209/34* (2013.01); *H04L 2209/72* (2013.01)

(58) Field of Classification Search
None
See application file for complete search history.

(56) References Cited

U.S. PATENT DOCUMENTS

| | | | |
|---|---|---|---|
| 4,885,777 A * | 12/1989 | Takaragi | G06Q 20/00 380/30 |
| 5,297,206 A | 3/1994 | Orton | |
| 5,519,778 A | 5/1996 | Leighton et al. | |
| 6,064,740 A | 5/2000 | Curiger et al. | |
| 6,091,819 A | 7/2000 | Venkatesan et al. | |
| 6,298,442 B1 * | 10/2001 | Kocher | G06F 7/723 380/28 |
| 6,480,605 B1 | 11/2002 | Uchiyama et al. | |
| 7,653,196 B2 * | 1/2010 | Koshy | H04L 9/065 380/28 |
| 7,792,894 B1 | 9/2010 | Cohn et al. | |
| 9,652,200 B2 | 5/2017 | Bos et al. | |
| 2002/0126838 A1 | 9/2002 | Shimbo et al. | |
| 2003/0072454 A1 * | 4/2003 | Krawetz | H04L 9/3236 380/284 |
| 2004/0054906 A1 * | 3/2004 | Carro | G06F 21/64 713/171 |
| 2006/0059219 A1 | 3/2006 | Koshy et al. | |

(Continued)

OTHER PUBLICATIONS

Menezes et al. (Alfred J. Menezes, Paul C. van Oorschot, Scott A. Vanstone, "Handbook of applied cryptography", 1997, ISBN: 0849385237), chapters 9 and 11.*

(Continued)

*Primary Examiner* — Peter Poltorak

(57) ABSTRACT

Various embodiments relate to a method of encoding data and related device and non-transitory machine readable storage medium, the method including: determining a set of digits, X, representative of a value to be encoded; determining a set of factor values, S, to be used in generating an encoded value, wherein the set of factor values, S, is a set of input value factors for a modular exponentiated digital signature process; for a given digit, x, of the set of digits, X, determining at least one factor value, s, of the set of factor values, S, corresponding to the given digit, x; and including the at least one factor value, s, in an encoded value.

19 Claims, 7 Drawing Sheets

(56) References Cited

U.S. PATENT DOCUMENTS

| | | | |
|---|---|---|---|
| 2006/0064761 A1* | 3/2006 | Multerer | G06F 21/10 |
| | | | 726/27 |
| 2008/0025502 A1 | 1/2008 | Kounavis et al. | |
| 2008/0226064 A1 | 9/2008 | Douguet et al. | |
| 2013/0054665 A1 | 2/2013 | Felch | |
| 2014/0019759 A1* | 1/2014 | Burmester | H04L 63/08 |
| | | | 713/172 |
| 2016/0019339 A1* | 1/2016 | Sazonov | G06F 19/22 |
| | | | 702/20 |
| 2016/0085955 A1 | 3/2016 | Lerner | |
| 2016/0179473 A1 | 6/2016 | Bos et al. | |
| 2016/0182230 A1 | 6/2016 | Peeters et al. | |
| 2016/0182236 A1 | 6/2016 | Peeters et al. | |

OTHER PUBLICATIONS

Sung, Performance analysis of superimposing-coded signatures files, Jun. 2005, Foundations of Data Organization and Algorithms, vol. 730 of the series Lecture Notes in Computer Science, pp. 115-129.*

Devine, "Design and Implementation of DDH: A Distributed Dynami Hashing Alogrith", Proceeding FODO '93 Proceeding of the 4th International Conference on Foundations of Data Organization and Algorithms, pp. 101-114.*

Stallings (William Stallings, "Cryptography and network security", 2th edition, 1998, ISBN: 0138690170).*

Schneier (Bruce Schneier, "Applied Cryptography, Protocols, Algorithms and Source Code in C", 2nd edition, 1996 ISBN: 0471117099).*

Roy (Roy et al., "Progress in Cryptology INDOCRYPT 2009", 10th INternational Conference on Cryptology in India, Dec. 2009, Springer LNCS 5922.*

A White-box DES Implementation for DRM applications, Digital Rights management Workshop-DRM 2002, Lecture Notes in Computer Science vol. 2696, Springer, 2003.

Billet, Olivier, et al. "Cryptanalysis of a white box AES implementation", Selected Areas in Cryptography-SAC 2004, Lecture Notes in Computer Science, vol. 3357, Springer 2004, 227-240.

Chow, Stanley, et al., "White-box cryptography and an AES implementation, Selected Areas in Cryptography-SAC 2002", (Kaisa Nyberg and Howard M. Heys, eds.) Lecture Notes in Computer Science, vol. 2595, 2003, 250-270.

Elgamal, Taher, "A public key cryptosystem and a signature scheme based on a discrete logarithms", IEEE Transactions on Information Theory 31, 1985, 469-472.

Jacob, Matthias, et al., "Attacking an obfuscated cipher by injecting faults, Digital Rights Management Workshop-DRM 2002", Lecture Notes in Computer Science vol. 2696, Springer, 2003, 16-31.

Karroumi, Mohamed, "Protecting white-box AES with dual ciphers, Information Security and Cryptology-ICISC 2010", Lecture notes in Computer Science vol. 6829, Springer 2010, 278-291.

Rivest, et al., "A Method for obtaining digital signatures and public-key cryptosystems, Communications of the ACM 21", 1978, 120-126.

Xiao, et al., "A Secure implementation of white-box AES, Computer Science and its Applications-CSA", 2009, 1-6.

Arends Telematica Institut R Austein ISC M Larson Verisign D Massey Colorado State University S Rose Nist R: "Resource Records for the DNS Security Extensions; rfc4034.txt", 5. JCT-VC Meeting; 96. MPEG Meeting; Mar. 16, 2011-Mar. 23, 2011; Geneva; (Joint Collaborative Team on Video Coding of ISO/IEC JTC1/SC29/WG11 and ITU-T SG. 16); URL: http://wftp3. itu.int/av-arch/jctvc-site/, Internet Engineering Task Force, IETF, CH, Mar. 1, 2005 (Mar. 1, 2005), XP015041965, ISSN: 0000-0003.

Josefsson SJD S: "The Base16, Base32, and Base64 Data Encodings; rfc4648.txt", 5. JCT-VC Meeting; 96. MPEG Meeting; Mar. 16, 2011-Mar. 23, 2011; Geneva; (Joint Collaborative Team on Video Coding of ISO/IEC JTC1/SC29/WG11 and ITU-T SG.16); URL: http://wftp3.itu.int/av-arch/jctvc-site/, Internet Engineering Task Force. IETF, CH, Oct. 1, 2006 (Oct. 1, 2016), XP015055032, ISSN:0000-0003.

Extended European Search Report dated Mar. 16, 2016 for EP Application No. EP15201631.7.

Extended European Search report dated Aug. 30, 2016 for EP Application No. 16162985.2, 4 pages.

Non-Final Office Action dated Jun. 1, 2017 for U.S. Appl. No. 14/689,219, 7 pages.

Restriction Requirement dated Jan. 26, 2017 for U.S. Appl. No. 14/689,219, 5 pages.

Final Office Action dated Nov. 16, 2016 for U.S. Appl. No. 14/689,139, 6 pages.

Non-Final Office Action dated May 20, 2016 for U.S. Appl. No. 14/689,139, 9 pages.

European Search Report dated 28 Jun. 2016 for EP Application No. EP 15202799.1, 6 pages.

Non-Final Office Action dated Dec. 1, 2016 for U.S. Appl. No. 14/624,874, 4 pages.

Non-Final Office Action dated Sep. 26, 2016 for U.S. Appl. No. 14/624,874, 6 pages.

Notice of Allowance dated Mar. 10, 2017 for U.S. Appl. No. 14/624,874, 5 pages.

Notice of Allowance dated Oct. 7, 2016 for U.S. Appl. No. 14/705,316, 24 pages.

Arndt, "Algorithms for Programmers—ideas and source code", 2004, 938 pages.

Bajard, Jean-Claude et al., "An RNS montgomery modular multiplication algorithm", IEEE Trans. Computers 47, No. 7, 1998, 766-776.

Bajard, Jean-Claude et al., "Fault Detection in RNS Montgomery Modular Multiplication," 21st IEEE Symposium on Computer Arithmetic, Apr. 7, 2013, pp. 119-126.

Bellare, M. et al., "The Exact Security of Digital Signatures—How to Sign with RSA and Rabin," May 12, 1996; Advances in Cryptology—Eurocrypt 1996 International Conference of the Theory and Application of Cryptographic Techniques, Saragossa, May 12-16, 1996; XP019194382, section 1.1, ISBN: 978-3-540-61186-8.

Berstein, "Enumerating and counting smooth integers", 1991; 4 pages.

Garner, Harvey, "The residue number system, IRE Transactions on Electronic Computers", 1959, 140-147.

Hartke, Stephen, "Ranking and Unranking of k-Subsets, or How I Learned to Stop Worrying and Love Colex," Presentation, Department of Mathematics, University of Nebraska-Lincoln; www.math.unl.edu/shartke2; 62 pages.

Menezes et al., "Handbook of Applied Cryptography, Chapter 11—Digital Signatures," In Handbook of Appplied Cryptography, Jan. 1, 1997; CRC Press, XP055037114; pp. 425-488; section 11.1.1.

Merrill, Roy D., "Improving digital computer performance using residue No. theory, Electronic Computers", IEEE Transactions on EC-13, No. 2, 1964, pp. 93-101.

Montgomery, Peter L., "Modular multiplication without trial division," Mathematics of Computation, No. 170, vol. 44; Apr. 1985, pp. 519-52.

Posch, Karl C. et al., "Modulo reduction in residue number systems," IEEE Trans. Parallel Distrib. Syst., May 1995, pp. 449-454.

Royle, "Combinatorial enumeration : Theory and Practice", Presenation; 2004; 46 pages.

Stolee, "Ranking and unranking of combinations and permutations", http://computational combinatorics.wordpress.com/2012/09/10 ranking -and-unranking-of-combinations-and-permutations/, Sep. 2012; 7 pages.

Notice of Allowance dated Dec. 8, 2017 for U.S. Appl. No. 14/689,219, 8 pages.

* cited by examiner

GENERAL ENCODING FUNCTIONS FOR MODULAR EXPONENTIATION ENCRYPTION SCHEMES

TECHNICAL FIELD

Various embodiments disclosed herein relate generally to data encoding and digital signature and, more particularly but not exclusively, to encoding for RSA-based digital signature schemes.

BACKGROUND

Digital signature schemes commonly apply encoding processes to data prior to signing a message to ensure that the data conforms to a pre-chosen alphabet to which the scheme applies. For example, a standard RSA algorithm using a key 3-tuple of <N, e, d> first converts each symbol to a corresponding value between 0 and N. Other encoding schemes may be used for different sets of input values to enable signature schemes that exploit various mathematical properties of the values in the input value set.

After encoding, the encoded values are used to creature a signature for transmission. Some encryption algorithms, such as RSA, utilize a modular exponentiation function to create such a signature. As an example RSA processes an encoded value a using the private key pair <N, d> by computing $a^d$ mod N. RSA would then verify the signature value, b, using the public key pair <N, e> by first computing be mod N. A decoding function is then applied to the resulting value to retrieve the original value.

SUMMARY

A brief summary of various embodiments is presented below. Some simplifications and omissions may be made in the following summary, which is intended to highlight and introduce some aspects of the various embodiments, but not to limit the scope of the invention. Detailed descriptions of a preferred embodiment adequate to allow those of ordinary skill in the art to make and use the inventive concepts will follow in later sections.

Various embodiments described herein relate to a method of encoding data and related device and non-transitory machine-readable storage medium, the method including: determining a set of digits, X, representative of a value to be encoded; determining a set of factor values, S, to be used in generating an encoded value, wherein the set of factor values, S, is a set of input value factors for a modular exponentiated process; for a given digit, x, of the set of digits, X, determining at least one factor value, s, of the set of factor values, S, corresponding to the given digit, x; and including the at least one factor value, s, in an encoded value.

Various embodiments described herein relate to a method of verifying a digital signature and related device and non-transitory machine-readable storage medium, the method including: receiving a message, m, and a digital signature from a sending party; verifying the digital signature using a public key associated with the sending party to produce a reference signature, a; creating a message digest, h, based on the received message; encoding the message digest, h, to produce an encoded digest, v, including: determining a set of digits, X, representative of the message digest, h, determining a set of factor values, S, to be used in generating an encoded value, for a given digit, x, of the set of digits, X, determining at least one factor value, s, of the set of factor values, S, corresponding to the given digit, x, and including the at least one factor value, s, in the encoded digest, v; comparing the reference signature, a, to the encoded digest, v, to determine whether the sending party is authentic.

Various embodiments described herein relate to a method of signing data and related device and non-transitory machine-readable storage medium, the method including: determining a set of digits, X, representative of a value to be signed; determining a set of factor values, S, to be used in generating a signature; for a given digit, x, of the set of digits, X, determining at least one factor value, s, of the set of factor values, S, corresponding to the given digit, x; generating at least one signature factor value, l, equivalent to the at least one factor value, s, raised to the power of a private key, d; and including the at least one encrypted factor value, l, in an encoded value.

Various embodiments are described wherein: the encoded value is an encoded and signed value; and including the at least one factor value, s, in the encoded value includes: retrieving at least one signature factor value, l, from a lookup table based on the at least one factor value, s, and including the at least one signature factor value, l, in the encoded and signed value.

Various embodiments are described wherein the encoded and signed value is a product of signature factor values and including the at least one signature factor value, l, in the encoded and signed value includes multiplying a working value for the encoded and signed value by the at least one signature factor value, l.

Various embodiments are described wherein determining a set of digits, X, representative of a value to be encoded includes: for a given radix, r, determining a radix-r representation of the value to be encoded, wherein the set of digits, X, include the digits of the radix-r representation and wherein each digit in the set of digits X is less than the radix, r.

Various embodiments are described wherein: the set of factor values, S, is an ordered set, and determining at least one factor value, s, of the set of factor values, S, corresponding to the given digit, x, includes: determining the factor value, $s_i$, located at a position within the set of factor values, S, that corresponds to the position of the given digit, x, within the set of digits, X.

Various embodiments are described wherein determining at least one factor value, s, of the set of factor values, S, corresponding to the given digit, x, further includes: raising the determined factor value, $s_i$, to the power of the given digit, x, to calculate the at least one factor value, s.

Various embodiments are described wherein the encoded value is a product of factor values and including the at least one factor value, s, in an encoded value includes multiplying a working value of the encoded value by the at least one factor value, s.

Various embodiments are described wherein the steps of determining at least one factor value, s, of the set of factor values, S, corresponding to the given digit, $x_i$, and including the at least one factor value, s, in an encoded value are performed for each digit in the set of digits, X.

Various embodiments are described wherein: determining a set of digits, X, representative of a value to be encoded includes, for a value $x \in \mathbb{Z}/2^n\mathbb{Z}$ and radix, r, determining a set of digits, $x_i \in X$ as $$x = \sum_{i=0}^{R-1} x_i r^i$$

where $$R = \left\lceil \frac{n}{\log_2 r} \right\rceil$$

and $x_i$ is less than r and greater than or equal to zero; and determining at least one factor value, s, of the set of factor values, S, corresponding to the given digit, x, and including the at least one factor value, s, in an encoded value together include calculating an encoded value as $$\prod_{i=0}^{R-1} s_i^{x_i}$$

where $s_i$ is the factor value at position i within the set of factor values S.

Various embodiments are described wherein: the encoded value is a signed and encoded value; determining a set of digits, X, representative of a value to be encoded includes, for a value $x \in \mathbb{Z}/2^n\mathbb{Z}$ and radix, r, determining a set of digits, $$x_i \in X$$

as $$x = \sum_{i=0}^{R-1} x_i r^i$$

where $$R = \left\lceil \frac{n}{\log_2 r} \right\rceil$$

and $x_i$ is less than r and greater than or equal to zero; and determining at least one factor value, s, of the set of factor values, S, corresponding to the given digit, x, and including the at least one factor value, s, in an encoded value together include calculating an encoded value as $$\prod_{i=0}^{R-1} L[i+1]^{x_i} \bmod N$$

where L[i+1] is an element within a lookup table L located at position i+1 and corresponding to a signature value of at least one factor value, s, in the set of factor values, S, the signature value corresponds to the at least one factor value, s, raised to the power of an exponent portion of a private key, d, and N is a modulus portion of the private key.

BRIEF DESCRIPTION OF THE DRAWINGS

In order to better understand various embodiments, reference is made to the accompanying drawings, wherein.

To facilitate understanding, identical reference numerals have been used to designate elements having substantially the same or similar structure or substantially the same or similar function.

DETAILED DESCRIPTION

Figure 1:
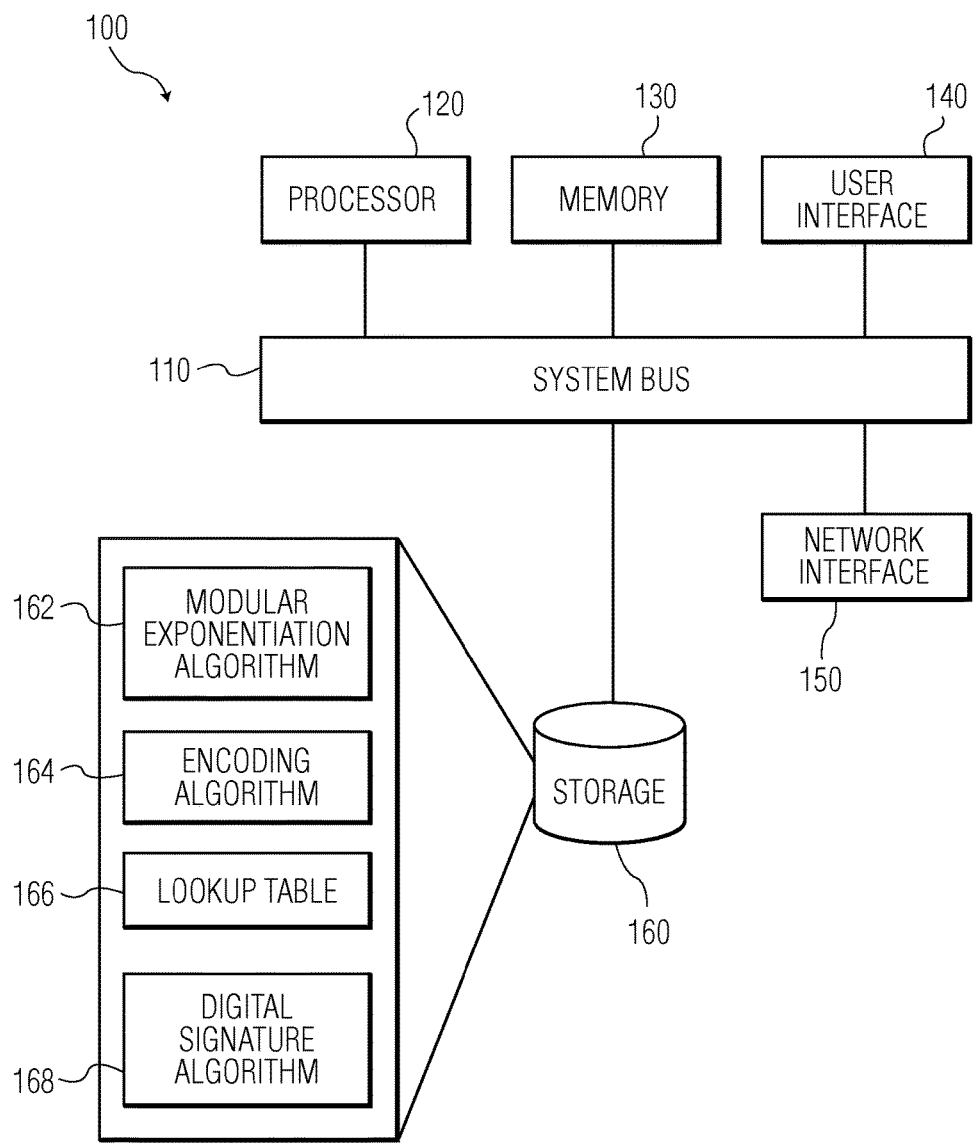
FIG. 1 illustrates an example of a hardware system for implementing the encoding and signature schemes described herein.

The description and drawings presented herein illustrate various principles. It will be appreciated that those skilled in the art will be able to devise various arrangements that, although not explicitly described or shown herein, embody these principles and are included within the scope of this disclosure. As used herein, the term, "or" refers to a non-exclusive or (i.e., and/or), unless otherwise indicated (e.g., "or else" or "or in the alternative"). Additionally, the various embodiments described herein are not necessarily mutually exclusive and may be combined to produce additional embodiments that incorporate the principles described herein.

In view of the growing contexts and applications for encryption, such as applications on untrusted platforms, recent efforts have been devoted to the concept of "white box cryptography," wherein cryptographic schemes are developed to be secure even when the cryptographic implementation is laid open to an attacker. White-box cryptography is concerned with the design and analysis of software implementations of cryptographic algorithms engineered to execute on untrusted platforms. Particularly, this is the scenario where the user of a particular device can decrypt messages (with a secret key) which are encrypted with his public key but is unable to extract or derive sufficient information to recover this secret key. Furthermore, it is assumed in such implementations that the user can be the attacker: e.g. the attacker has full access to the software implementation, can pause, alter and resume the execution of the software implementation at any time For example, in digital rights management systems, it is desirable to provide a content-consumer with the ability to easily authenticate themselves as a party that is entitled to access the content. It is also desirable, however, to prevent that content-consumer from sharing credentials with other parties for the purpose of provided those other parties with access to the same content that is only licensed to that original content-consumer.

One white-box approach to this scenario is to provide the content-consumer with the ability to digitally sign messages using a private key, d, assigned to the content-consumer without actually giving the private key, d, to the content-consumer. To that end, the content-consumer may be provided, instead, with a lookup table of pre-computed exponentiated values based on the private key, d. In various systems, for example, the look-up table may be provided to the content-consumer by, for example, a central digital rights management server for use in authenticating the content-consumer to one or more media servers serving the protected content. The content-consumer may then use this lookup table to compute digital signatures in spite of not knowing the value of their private key, d. It would be desirable to build upon these efforts to simplify the scheme and reduce the resources devoted to execution such as, for example, reducing the size of the look-up table.

It will be appreciated that, while various examples described herein are explained in the context of digital signature schemes, various aspects described herein may be adapted to data encryption schemes wherein data is encrypted with a public key and retrieved using a private key.

FIG. 1 illustrates an example of a hardware system 100 for implementing the encoding and signature schemes described herein. The hardware system 100 may correspond to virtually any device that may participate in a digital signature scheme such as, for example, a personal computer, laptop, tablet, mobile communications device, server, blade, smart card, near field communication (NFC) device, or other device. For example, the hardware system may correspond to a set-top box for receiving and rendering digital content or a server for providing digital content. Various applications of the method described herein will be apparent such as, for example, digital rights management (DRM), banking applications, and generally protecting cryptographic keys in devices such as mobile phones and television set-top boxes.

As shown, the device 100 includes a processor 120, memory 130, user interface 140, network interface 150, and storage 160 interconnected via one or more system buses 110. It will be understood that FIG. 1 constitutes, in some respects, an abstraction and that the actual organization of the components of the device 100 may be more complex than illustrated.

The processor 120 may be any hardware device capable of executing instructions stored in the memory 130 or the storage 150. As such, the processor may include a microprocessor, field programmable gate array (FPGA), application-specific integrated circuit (ASIC), or other similar devices.

The memory 130 may include various memories such as, for example L1, L2, or L3 cache or system memory. As such, the memory 130 may include static random access memory (SRAM), dynamic RAM (DRAM), flash memory, read only memory (ROM), or other similar memory devices.

The memory 130 may include various memories such as, for example L1, L2, or L3 cache or system memory. As such, the memory 130 may include static random access memory (SRAM), dynamic RAM (DRAM), flash memory, read only memory (ROM), or other similar memory devices.

The user interface 140 may include one or more devices for enabling communication with a user such as an administrator. For example, the user interface 140 may include a display, a mouse, and a keyboard for receiving user commands. In some embodiments, the user interface 140 may include a command line interface or graphical user interface that may be presented to a remote terminal via the network interface 150.

The network interface 150 may include one or more devices for enabling communication with other hardware devices. For example, the network interface 150 may include a network interface card (NIC) configured to communicate according to the Ethernet protocol. Additionally, the network interface 150 may implement a TCP/IP stack for communication according to the TCP/IP protocols. Various alternative or additional hardware or configurations for the network interface 150 will be apparent.

The storage 160 may include one or more machine-readable storage media such as read-only memory (ROM), random-access memory (RAM), magnetic disk storage media, optical storage media, flash-memory devices, or similar storage media. In various embodiments, the storage 160 may store instructions for execution by the processor 120 or data upon with the processor 120 may operate.

For example, as shown, the storage 160 includes a modular exponentiation algorithm 162 for use in signing or encrypting data. The modular exponentiation algorithm 162 additionally utilizes an encoding algorithm 164 to encode data prior to encryption or signing and in other cases, as will be explained below. In some embodiments, the modular exponentiation algorithm 162 and encoding algorithm 164 may be combined into a single algorithm, an example of which will be described below with respect to FIG. 4. In various embodiments, the modular exponentiation algorithm 162 may utilize a lookup table 166 of encrypted factor value such as, for example, where the modular exponentiation algorithm 162 is a white-box implementation. Various applications of the modular exponentiation and encoding algorithms 162, 164 will be apparent; an example of a digital signature algorithm 168 will be described in greater detail below with respect to FIGS. 5-6.

It will be apparent that various information described as stored in the storage 160 may be additionally or alternatively stored in the memory 130. In this respect, the memory 130 may also be considered to constitute a "storage device" and the storage 160 may be considered a "memory." Various other arrangements will be apparent. Further, the memory 130 and storage 160 may both be considered to be "non-transitory machine-readable media." As used herein, the term "non-transitory" will be understood to exclude transitory signals but to include all forms of storage, including both volatile and non-volatile memories.

While the hardware device 100 is shown as including one of each described component, the various components may be duplicated in various embodiments. For example, the processor 120 may include multiple microprocessors that are configured to independently execute the methods described herein or are configured to perform steps or subroutines of the methods described herein such that the multiple processors cooperate to achieve the functionality described herein. In other embodiments, such as those embodiments wherein the device 100 is implemented in a cloud computing environment, the various components may be physically located in diverse machines. For example, the processor 120 may include a first microprocessor in a first data center server and a second microprocessor in a second data center server. Various additional arrangements will be apparent.

Various modular exponentiation methods described herein may be premised on the prior selection of a set of factor values, S, from which encoded values to be processed are constructed. The set of factor values, S, may be virtually any ordered and increasing set of integers greater than zero. In mathematical terms, let S be a predefined set of m non-zero positive integer values, $S=\{s_1, \ldots, s_m\}$, that is sorted such that $s_i < s_j$ whenever $0 < i < j \leq m$. The set of values, V, that may be processed according to the modular exponentiation method for a given set S is then the set of values that may be constructed from those values in S such as by multiplying the chosen factors in S together:

$$V = \left\{ \prod_i v_i^{\alpha_i} : v_i \in S, \alpha_i \in \mathbb{Z}_{>0} \right\}$$

Exponentiated cryptographic schemes sign (and verify) data (at least partially) by raising the value to be signed/verified to a predetermined value, such as a predetermined public key exponent, e, or private key exponent, d. As will be understood, the calculation of an exponentiated value may be broken down into smaller operations by calculating the exponentiated factors of the value, and then finding the product of these exponentiated values. In other words, the commutative property is used to break the original calculation down into several smaller sub-calculations. According to the schemes detailed herein, because the value to be encrypted or signed is a member of the set V (i.e., is a value that includes as factors values in the set S), the resultant value may be computed by computing the encrypted or signature values of the constituent factors (i.e., those factors in S). In mathematical notation, $$b^d = \left( \prod_i b_i \right)^d = \prod_i b_i^d$$

where $b_i \in S$ are divisors of b and, as such, $b \in V$.

In white-box implementations, a lookup table may be provided with precomputed values for each factor in S raised to the power of the private key exponent, d, modulo N, the key modulus:

$$L[i] = s_i^d \mod N \text{ for } i \in \{1, \ldots, m\}.$$

Given the look-up table L, the base to be processed b, the fixed modulus N, and the definition of the subset V, the user is able to compute the signature value $b^d \mod N$ without knowing the private key exponent, d, as follows. First, if b=1, then $b^d \mod N = 1$. Otherwise, the user retrieves the l>0 divisors $b_i \in S$ of b (e.g., using trial division). The signed value may then be computed as $$\prod_{i=0}^{\ell-1} L[\iota(b_i)] \mod N$$

where t: $S \rightarrow \{1, \ldots, m\}$ is a function that returns the index of an element in S. In other words, $l(x) = i$ if and only if $x = s_i$.

It will be apparent that the selection of factors to include in S for a given implementation of the signature and encoding methods plays a role in the observed properties of the digital signature system. For example, if the factors are chosen as prime numbers or to be otherwise coprime to all other factors in the set S, then no information will be lost in the signature (i.e., the data can be verified to a single value). However, such a selection would lead to a lookup table that includes an entry for each element in the set S because no combination of elements in the set may be used to reconstruct another element through multiplication. Alternatively, when the elements in the set S are not entirely co-prime, the size of the lookup table may be reduced. For example, if $S \in \{2, 4\}$, the lookup table may omit a dedicated entry for the value 4, because the signed value $4^d$ may be calculated using the entry for the value 2: $4^d = 2^d * 2^d$. Such a non-coprime selection for S, however, may result in some degree collision between signed values, such that the information may not be easily retrieved without inferring the correct value from a set of possible verified values. Such selections, however, may nonetheless be useful. For example, some uses of the signature and encoding methods described herein (e.g., the example digital signature scheme described with respect to FIGS. 5-6) may operate without decoding any data.

Figure 2:
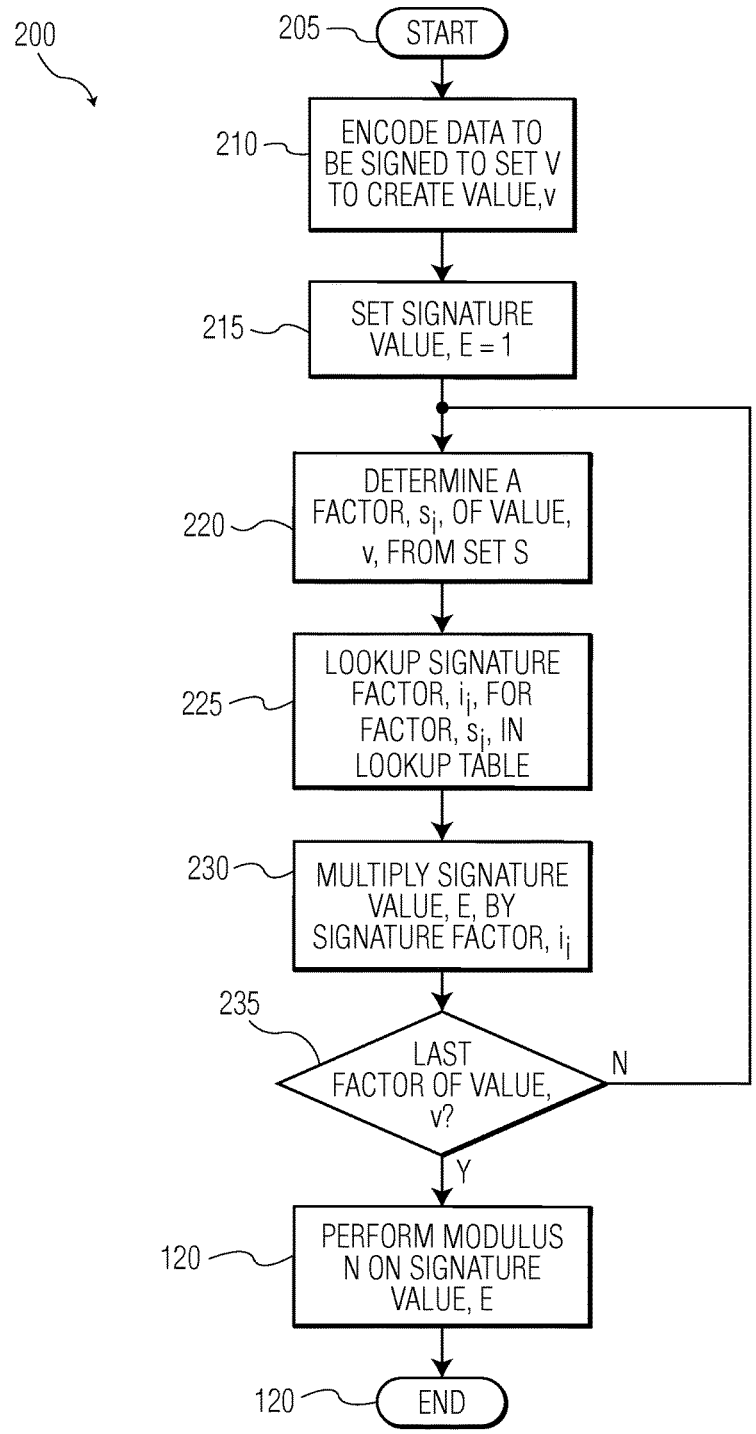
FIG. 2 illustrates an example of a method for signing data.

FIG. 2 illustrates an example of a method 200 for signing data in accordance with the above-described example. In various embodiments, the method 200 may correspond to the modular exponentiation algorithm 162 and may be performed by a processor such as the processor 120. The method 200 begins in step 205 and proceeds to step 210 where the processor encodes the data to be signed according to an encoding function such as one of the encoding functions from the classes described herein. For example, the processor may encode the data according to the example method described with respect to FIG. 3. Next, in step 215, the processor initializes a working signature value, E, to a value of 1 and, in step 220, the processor determines a factor $s_i$ of the value v to be signed. For example, the processor may utilize trial division by attempting to divide the current working value by each potential factor in the set of factors S. Once a factor $s_i$ is identified, the working value of the value v to be signed may be set equal to the previous working value divided by the identified factor (to account for the fact that the identified factor has been accounted for in the signed value).

In step 225, the processor looks up the signature factor $l_i$ corresponding to the identified factor $s_i$ in the lookup table. It will be appreciated that, in various embodiments wherein a lookup table is not used, the processor may instead calculate the signature factor in step 225 as $l_i = s_i^d$. Then, in step 230, the processor includes the signature factor $l_i$ in the working signature value E. In step 235, the processor determines whether the most recently identified factor $s_i$ is the final factor of the value to be signed v. For example, the processor may determine whether the working value of v is equal to 1. If not, additional factors remain to be processed and the method returns to step 2220. Otherwise, the processor sets the final signature value equal to the signature value, E, modulo N in step 240. The method then ends in step 245.

It will be appreciated that the example method 200 may be modified in various manners to achieve a similar result. For example, step 220 may be modified to calculate all factors of the value to be signed in a single pass. In such embodiments, step 235 may loop back to step 225 instead of step 220 when additional factors remain to be processed. As another alternative, the modulus operation of step 240 may performed between steps 230 and 235 to reduce the size of the working signature value. E. Various additional modifications will be apparent.

According to various embodiments described herein, the encoding functions used (e.g. in step 210 of method 200) may belong to a class of encoding functions that digests values $\mathbb{Z}/2^n\mathbb{Z}$ to V. For example, one could write any value $x \in \mathbb{Z}/2^n\mathbb{Z}$ in a radix-r representation as $x = \sum_{i=0}^{R-1} x_i r^i$ where $$R = \left\lceil \frac{N}{\log_2 r} \right\rceil$$

and $0 \leq x_i < r$ for an integer radix $r > 1$. Next, the encoding may be defined as $$\sum_{i=0}^{R-1} x_i r^i \rightarrow \prod_{i=0}^{R-1} s_i^{x_i}$$

where $s_i \in S$ and therefore $R=|S|$ (i.e., the number of elements, or cardinality, of S is equal to R).

Figure 3:
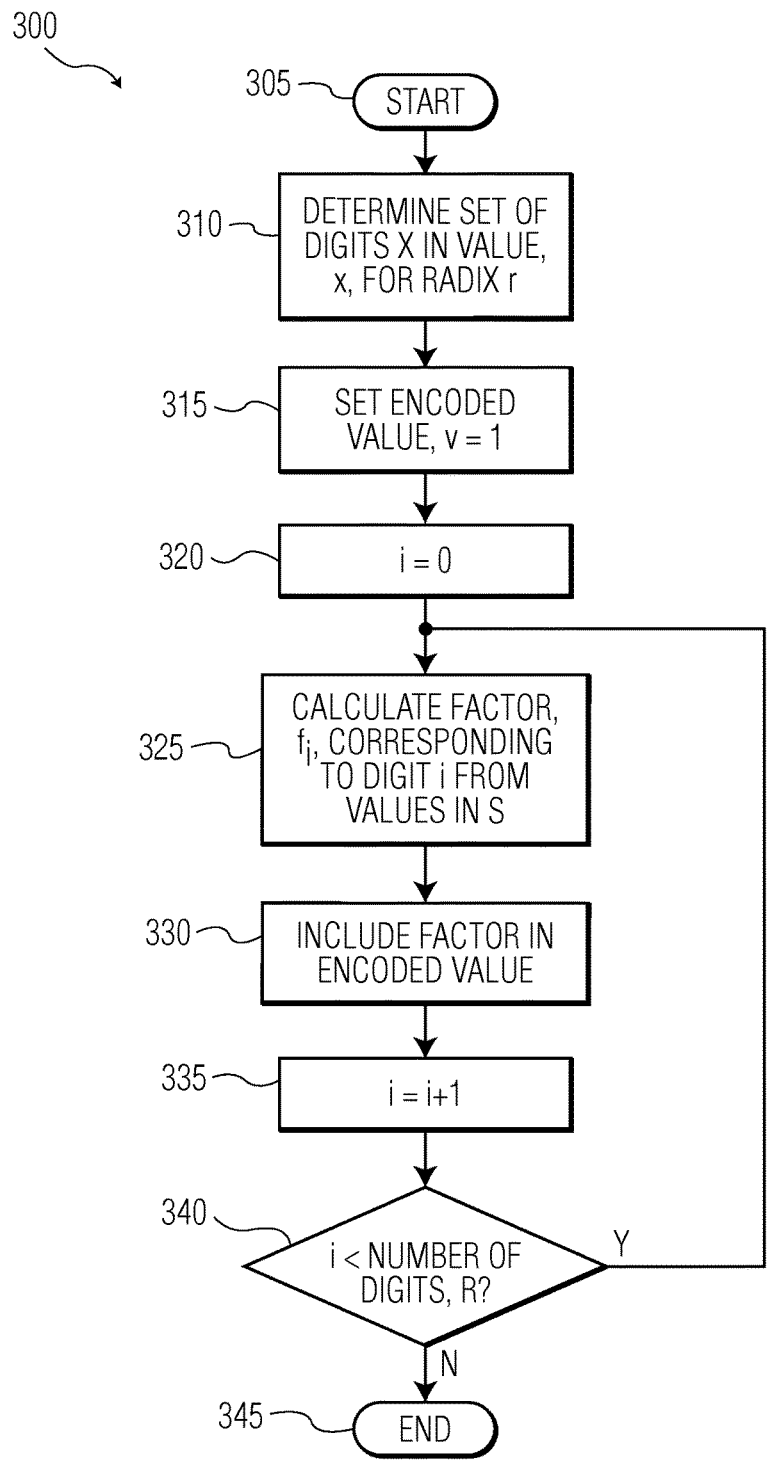
FIG. 3 illustrates an example of a method for encoding data.

FIG. 3 illustrates an example of a method 300 for encoding data in accordance with the above-described example. In various embodiments, the method 300 may correspond to the encoding algorithm 164 and may be performed by a processor such as the processor 120. The method 300 begins in step 305 and proceeds to step 310 where the processor determines a set of digits X in a value x for a given radix r. In various embodiments, the radix r may be fixed in the encoding implementation. Various algorithms for determining the set of digits X in view of the foregoing disclosure will be apparent.

In steps 315 and 320, the processor initializes the encoded value, v, and working index, i, to values of 1 and 0, respectively. Next, in step 325, the processor calculates a factor $f_i$ corresponding to digit i from the values in S. For example, according to the foregoing example, the processor may determine the value $s_i \in S$ located at position i, and raises the factor to the power of the $i^{th}$ digit in X.

After determining the factor $f_i$ corresponding to digit i, the processor includes the factor in the working encoded value in step 330. For example, the processor may multiply the current working encoded value by the factor $f_i$. The processor then increments the working index i in step 335. Then, in step 340 the processor determines whether additional digits remain to be processed by determining whether i is less than the number of digits, R. If so, the method 300 loops back to step 325. Otherwise, the method 300 proceeds to end in step 345.

In various alternative embodiments, the encoding and signature methods may be combined into a single method. In other words, the factors may be signed as they are determined as part of the encoding algorithm. In mathematical notation, $$ENCODE(x)^d = \prod_{i=0}^{R-1} (s_i^{x_i})^d = \prod_{i=0}^{R-1} (s_i^d)^{x_i} = \prod_{i=0}^{R-1} L[i+1]^{x_i}$$

where L[i+1] is the value located at position i+1, within the lookup table, which is indexed beginning at an index of "1." Alternatively, when the private key exponent d is known or when the public key exponent e is to be used for signature, the second product above may be used to calculate the signature value by raising each factor $s_i$, to the power of ($d*x_i$).

Figure 4:
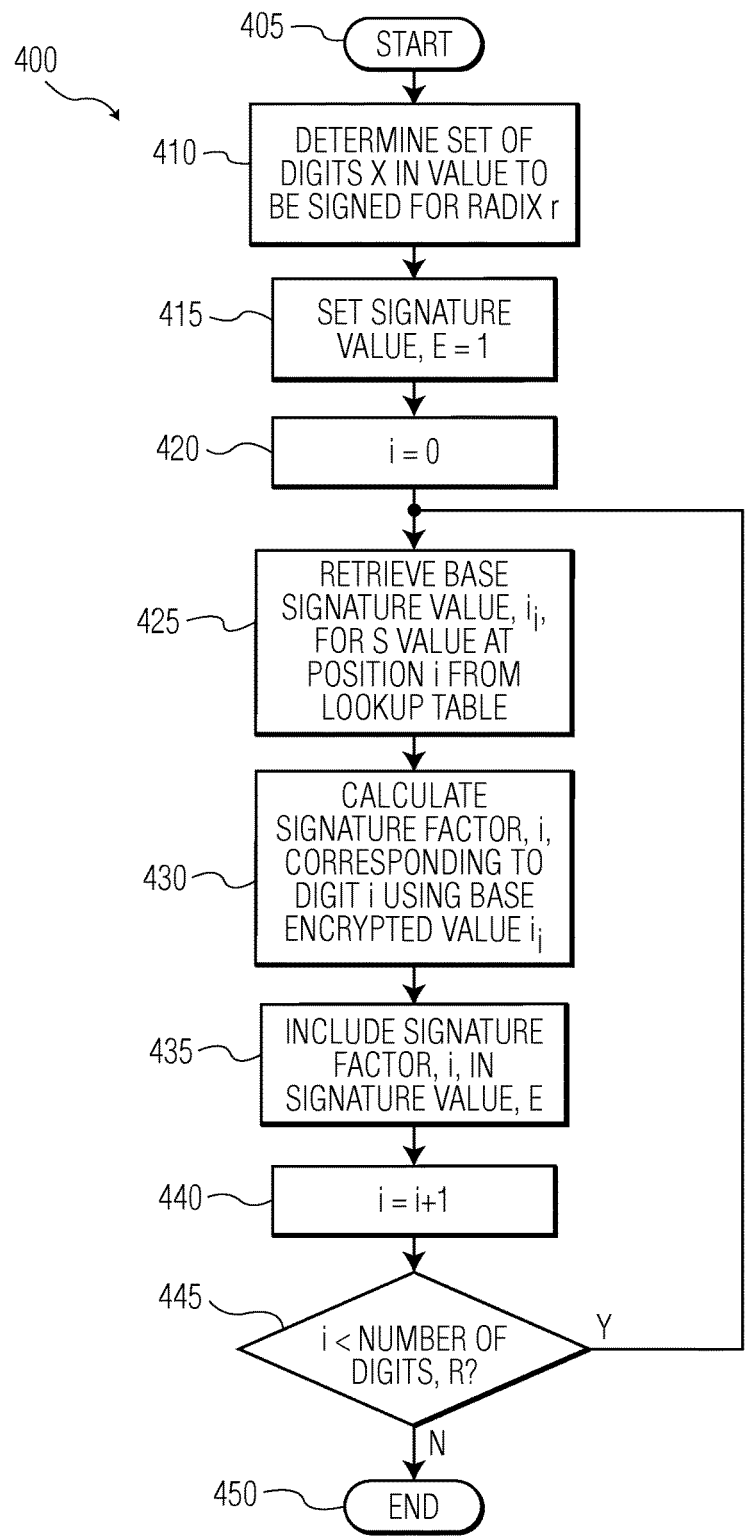
FIG. 4 illustrates an example of a alternative method for encoding and signing data.

FIG. 4 illustrates an example of a alternative method 400 for encoding and signing data according to the above-described example. In various embodiments, the method 400 may correspond to both the modular exponentiation algorithm 162 and encoding algorithm 164 and may be performed by a processor such as the processor 120. The method 400 begins in step 405 and proceeds to step 410 where the processor determines a set of digits X in a value x for a given radix r. In various embodiments, the radix r may be fixed in the encoding implementation. Various algorithms for determining the set of digits X in view of the foregoing disclosure will be apparent.

In steps 415 and 420, the processor initializes the signature value, E, and working index, i, to values of 1 and 0, respectively. Next, in step 425, the processor calculates a base signature factore value $l_i$ for the $i^{th}$ in S from the lookup table (or, alternatively, computes the base signature factor value $l_i$ using a known private or public key exponent). Next, in step 430, the processor calculates the signature factor value l to be included in the signature value E. For example, according to the foregoing example, the processor may raise the factor l to the power of the $i^{th}$ digit in X.

After determining the signature factor l corresponding to digit i, the processor includes the factor in the working encoded value in step 435. For example, the processor may multiply the current working encoded value by the factor l. The processor then increments the working index i in step 440. Then, in step 445 the processor determines whether additional digits remain to be processor by determining whether i is less than the number of digits, R. If so, the method 400 loops back to step 425. Otherwise, the method 400 proceeds to end in step 450.

Figure 5:
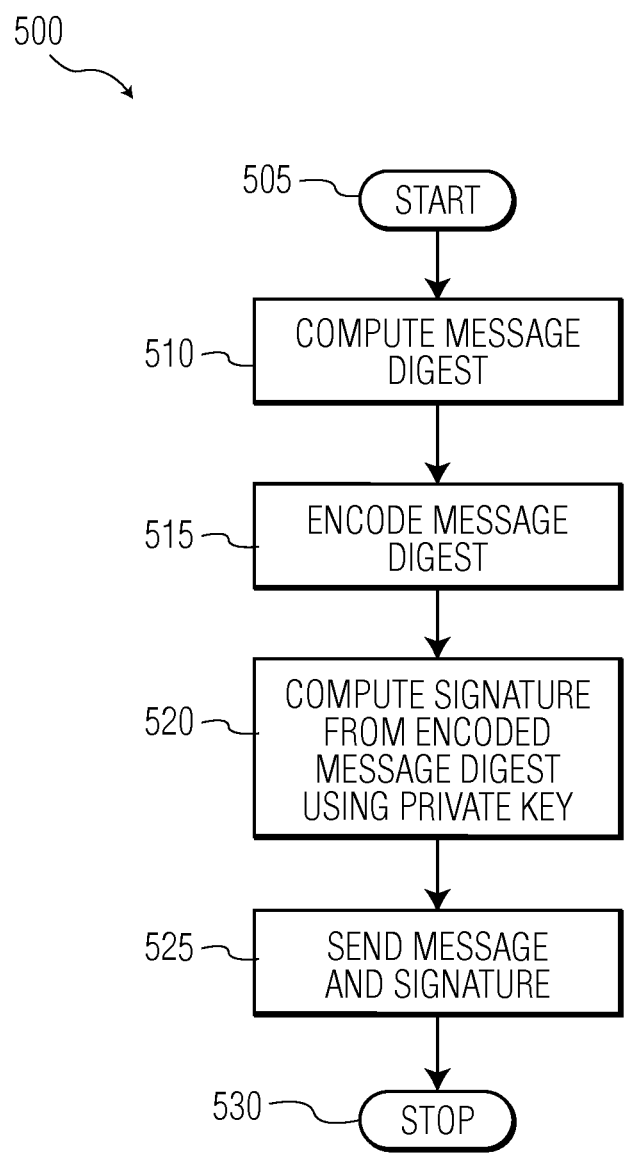
FIG. 5 illustrates an example of a method for creating and transmitting a digital signature.

As noted above, the encoding and signature methods described herein may be used in various diverse applications. For example, methods described herein may be used as part of a digital signature scheme. FIG. 5 illustrates an example of a method 500 for creating and transmitting a digital signature. The method 500 may correspond to at least a transmission aspect of the digital signature algorithm 168 and may be performed by a processor such as the processor 120.

The method 500 begins in step 505 and proceeds to step 510 where the processor computes a message digest from a message to be signed and transmitted. For example, the processor may use a predetermined hash algorithm to produce the message digest. Next, in step 515, the processor encodes the message digest to produced an encoded message digest. The processor may encode the digest using any of the encoding algorithms described herein such as, for example, the encoding algorithm described above with respect to FIG. 3. Then, in step 520, the processor computes a signature from the encoded message digest by signing the encoded message digest using a private key exponent. For example, the processor may use a modular exponentiation algorithm such as that described above with respect to FIG. 2. In various embodiments, steps 515 and 520 may be combined by, for example, using the example algorithm described above with respect to FIG. 4. After generating the signature, the processor may send the message and signature to a recipient in step 525 and the method 500 may proceed to end in step 530.

Figure 6:
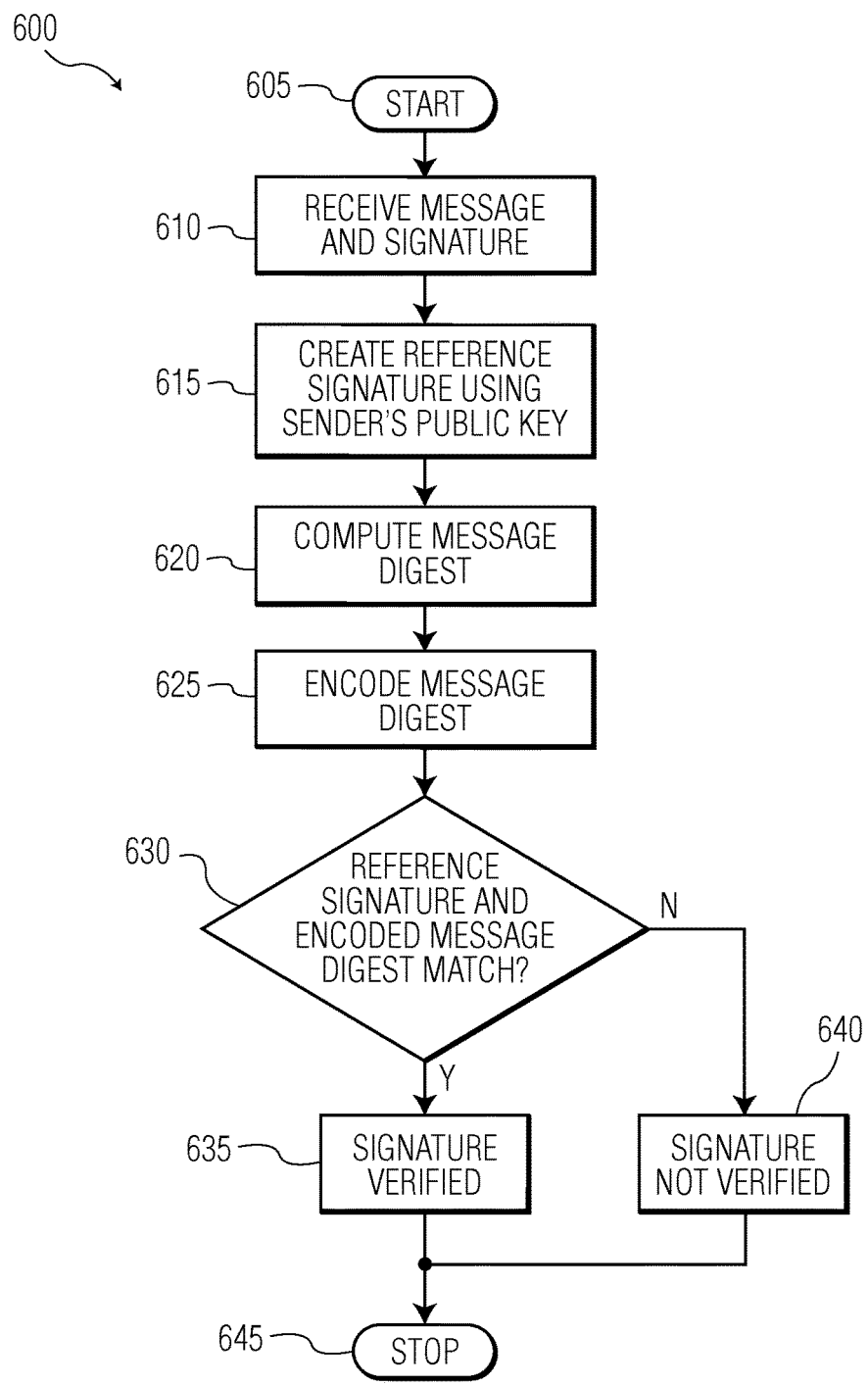
FIG. 6 illustrates an example of a method for verifying a received digital signature.

FIG. 6 illustrates an example of a method 600 for verifying a received digital signature. The method 600 may correspond to at least a reception aspect of the digital signature algorithm 168 and may be performed by a processor such as the processor 120.

The method begins in step 605 and proceeds to step 610 where the processor receives a message and signature to be verified. For example, the processor may receive a message and signature transmitted by a sending device executing step 525 of method 500. Next, in step 615, the processor verifies the signature using the sender's public key to produce a reference (encoded) value. Then, in step 620, the processor computes a message digest using, for example, a hash algorithm. The processor proceeds to encode the message digest in step 625 according to any one of the encoding functions described herein such as, for example, the encoding function described with respect to FIG. 3. In various embodiments, step 620, 625 may perform the same operations as performed in steps 510, 515 of method 500.

Next, in step 630, the processor compares the reference value to the encoded message digest and to determine if the values match. If so, the processor determines in step 635 that the message and signature is verified. Otherwise, the processor determines in step 640 that the signature is not verified. The method 600 then proceeds to step 645.

It will be noted that, according to example method 600, the signature may be verified without decoding the reference value. Instead, the reference value is compared to an encoded message digest to determine equivalency. As such, various functional embodiments may omit implementing any decoding function and, instead, operate with only an encoding function. Further, because no decoding function is used, sets of S that yield colliding encoded results across the possible input values (i.e., information loss on encode) may nonetheless be used to provide some degree of certainty that the reference message digest was created using the private key corresponding to the known public key (and is therefore verified). Specifically, if the encoding algorithm produces the same output value on two subsequent executions, it is likely (if not certain) that the same input value was used both times.

As a simple example of an encoding function in the above-described family, the radix r may be set equal to N, thereby yielding a set of S that includes only a single element $\tau \in (\mathbb{Z}/N\mathbb{Z}) \setminus \{\pm 1\}$. The set of input values, V, would then become $$V = \{\tau^\alpha : \tau \in S, \alpha \in \mathbb{Z}_{>0}\}$$

The index function i becomes the trivial function i(x)=1. The encode function then becomes ENCODE(x)=$\tau^x$ mod N.

and the lookup table may be created with a single element L[1]=$\tau^d$. When used according to a signature scheme, such as the signature schemes described above, the generation step may be simplified to $$t = L[1]^{\mathcal{H}(m)} = (\tau^d)^{\mathcal{H}(m)} = (\tau^{\mathcal{H}(m)})^d \pmod{N}.$$

For a message m and has function $\mathcal{H}$. Signature verification simplifies to verifying that $$t^e = \tau^{\mathcal{H}(m)}$$

holds.

Figure 7:
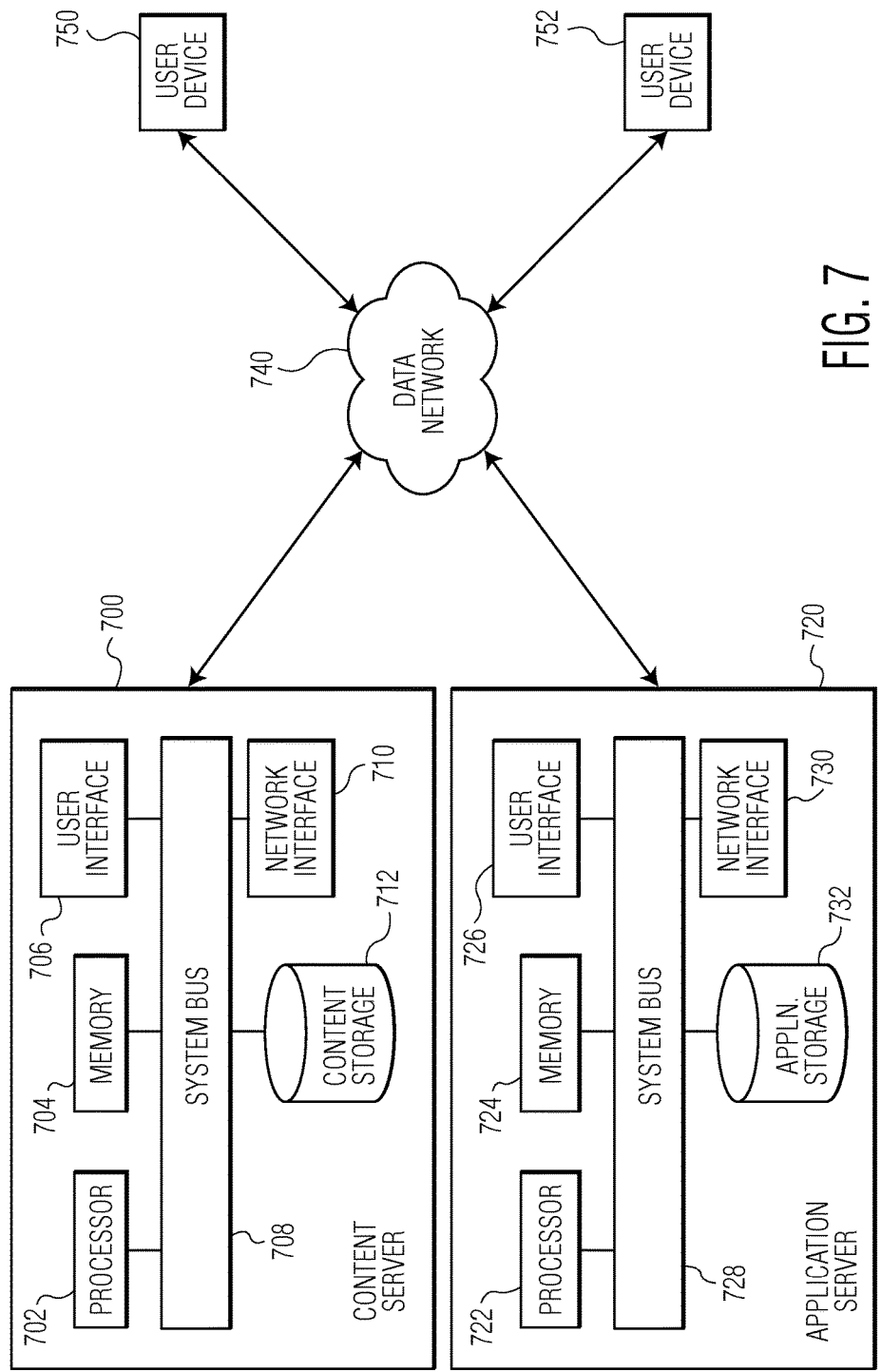
FIG. 7 illustrates an example of a system for providing a user device secure content and a software application that processes the secure content.

FIG. 7 illustrates an example of a system for providing a user device secure content and a software application that processes the secure content. The system includes a content server 700, application server 720, user devices 750, 752, and a data network 740. The user devices 750, 752 may request access to secure content provided by the content server 700 via data network 740. The data network can be any data network providing connectivity between the user devices 750, 752 and the content server 700 and application server 720. The user devices 750, 752 may be one of a plurality of devices, for example, set top boxes, media streamers, digital video recorders, tablets, mobile phones, laptop computers, portable media devices, smart watches, desktop computers, media servers, etc.

The user request for access may first require the downloading of a software application that may be used to process the secure content provided by the content server 700. The software application may be downloaded from the application server 720. The software application may be obscured using the techniques described above as well as operate as described above. Once the user devices 750, 752 install the software application, the user device may then download secure content from the content server 700 and access the secure content using the downloaded software application. For example, the downloaded software application may perform decryption of encrypted content received from the content server. In other embodiments, the software application may perform other secure operations, such as for example, encryption, digital signature generation and verification, etc.

The content server 700 may control the access to the secure content provided to the user devices 750, 752. As a result when the content server 700 receives a request for secure content, the content server 700 may transmit the secure content to the requesting user device. Likewise, the application server 720 may control access to the software application provided to the user devices 750, 752. As a result when the content server 720 receives a request for the software application, the application server 720 may transmit the software application to the requesting user device. A user device requesting the software application or secure content may also be authenticated by the respective servers, before providing the software application or secure content to the user device.

The content server 700 may include a processor 702, memory 704, user interface 706, network interface 710, and content storage 712 interconnected via one or more system buses 708. It will be understood that FIG. 7 constitutes, in some respects, an abstraction and that the actual organization of the components of the device 700 may be more complex than illustrated.

The processor 702 may be any hardware device capable of executing instructions stored in memory 704 or storage 712. As such, the processor may include a microprocessor, field programmable gate array (FPGA), application-specific integrated circuit (ASIC), or other similar devices.

The memory 704 may include various memories such as, for example L1, L2, or L3 cache or system memory. As such, the memory 704 may include static random access memory (SRAM), dynamic RAM (DRAM), flash memory, read only memory (ROM), or other similar memory devices.

The user interface 706 may include one or more devices for enabling communication with a user such as an administrator. For example, the user interface 706 may include a display, a mouse, and a keyboard for receiving user commands.

The network interface 710 may include one or more devices for enabling communication with other hardware devices. For example, the network interface 710 may include a network interface card (NIC) configured to communicate according to the Ethernet protocol. Additionally, the network interface 710 may implement a TCP/IP stack for communication according to the TCP/IP protocols. Various alternative or additional hardware or configurations for the network interface 710 will be apparent.

The content storage 712 may include one or more machine-readable content storage media such as read-only memory (ROM), random-access memory (RAM), magnetic disk storage media, optical storage media, flash-memory devices, or similar storage media. In various embodiments, the content storage 712 may store content to be provided to users.

The application server 720 includes elements like those in the content server 700 and the description of the like elements in the content server 700 apply to the application server 720. Also, the content storage 712 is replaced by application storage 732. Further, it is noted that the content server and applications server may be implemented on a single server. Also, such servers may be implemented on distributed computer systems as well as on cloud computer systems.

As will be understood, the modular exponentiation, encoding, or digital signature methods described herein may be deployed and utilized within the system of FIG. 7 or similar systems in various manners. For example, the user devices 750, 752 may be provided by a manufacturer or other seller preconfigured to transmit signed messages to the content server 700 to request the provision of content. Alternatively, the user devices 750, 752 may not be fully preconfigured for such operation; instead, the application server 720 may communicate with the user devices 750, 752 to effect such configuration. For example, the application server may transmit code instructions for implementing the methods described herein or data defining one or more lookup tables.

According to the foregoing, various embodiments enable the removal of decoding functions and, instead, define a generalized family of encoding functions. Such encoding functions may be used, for example, in a digital signature scheme that compares encoded hashed values instead of the hashed values themselves. The resulting scheme is much simpler and allows for using much smaller look-up table than in other efforts. Various additional benefits will be apparent in view of the foregoing.

It should be apparent from the foregoing description that various embodiments of the invention may be implemented in hardware. Furthermore, various embodiments may be implemented as instructions stored on a non-transitory machine-readable storage medium, such as a volatile or non-volatile memory, which may be read and executed by at least one processor to perform the operations described in detail herein. A machine-readable storage medium may include any mechanism for storing information in a form readable by a machine, such as a personal or laptop computer, a server, or other computing device. Thus, a non-transitory machine-readable storage medium excludes transitory signals but may include both volatile and non-volatile memories, including but not limited to read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various embodiments have been described in detail with particular reference to certain aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A non-transitory machine-readable storage medium encoded with instructions for execution by a white-box implementation in a cryptographic system for performing an encryption/decryption operation, the non-transitory machine-readable medium comprising:

instructions for receiving, by the cryptographic system, a message instructions for encrypting, by the cryptographic system, the message, including:

instructions for determining, by the cryptographic system, a set of digits, X, representative of a value to be encoded during the cryptographic operation;

instructions for determining, by the cryptographic system, a set of factor values, S, to be used in generating an encoded value, wherein the set of factor values, S, is a set of input value factors for a modular exponentiated process;

instructions for, determining, by the cryptographic system, for a given digit, x, of the set of digits, X, at least one factor value, s, of the set of factor values, S, corresponding to the given digit, x; and instructions for including, by the cryptographic system, the at least one factor value, s, in an encoded value for the cryptographic operation, wherein the instructions for determining, by the cryptographic system, a set of digits, X, representative of a value to be encoded during the cryptographic operation, comprise instructions for, for a value $x \in \mathbb{Z}/2^n\mathbb{Z}$ and radix, r, determining, by the cryptographic system, a set of digits, $x_i \in X$ as $$x = \sum_{i=0}^{R-1} x_i r^i$$

where $$R = \left\lceil \frac{n}{\log_2 r} \right\rceil$$

and $x_i$ is less than r and greater than or equal to zero;

the instructions for determining, by the cryptographic system, at least one factor value, s, of the set of factor values, S, corresponding to the given digit, x, and, by the cryptographic system, the at least one factor value, s, in an encoded value together comprise instructions for calculating, by the cryptographic system, an encoded value as $$\prod_{i=0}^{R-1} s_i^{x_i}$$

where $s_i$ is the factor value at position i within the set of factor values S, instructions for transmitting, by the cryptographic system, the encrypted message.

2. The non-transitory machine-readable storage medium of claim 1, wherein:

the encoded value is signed after being encoded; and the instructions for including, by the cryptographic system, the at least one factor value, s, in the encoded value comprise:

instructions for retrieving, by the cryptographic system, at least one signature factor value, l, from a lookup table based on the at least one factor value, s, and instructions for including, by the cryptographic system, the at least one signature factor value, l, in the encoded and signed value.

3. The non-transitory machine-readable storage medium of claim 2, wherein the encoded value is a product of signature factor values and the instructions for including, by the cryptographic system, the at least one signature factor value, l, in the encoded and signed value comprise instructions for multiplying, by the cryptographic system, a working value for the encoded and signed value by the at least one signature factor value, l.

4. The non-transitory machine-readable storage medium of claim 1, wherein the instructions for determining, by the cryptographic system, a set of digits, X, representative of a value to be encoded comprise:
   determining, by the cryptographic system, instructions for, for a given radix, r, a radix-r representation of the value to be encoded,
   wherein the set of digits, X, comprise the digits of the radix-r representation and wherein each digit in the set of digits X is less than the radix, r.

5. The non-transitory machine-readable storage medium of claim 1, wherein:
   the set of factor values, S, is an ordered set, and
   the instructions for determining, by the cryptographic system, at least one factor value, s, of the set of factor values, S, corresponding to the given digit, x, comprise:
      instructions for determining, by the cryptographic system, the factor value, $s_1$, located at a position within the set of factor values, S, that corresponds to the position of the given digit, x, within the set of digits, X.

6. The non-transitory machine-readable storage medium of claim 5, wherein the instructions for determining, by the cryptographic system, at least one factor value, s, of the set of factor values, S, corresponding to the given digit, x, further comprise:
   instructions for raising, by the cryptographic system, the determined factor value, $s_i$, to the power of the given digit, $x_i$, to calculate the at least one factor value, s.

7. The non-transitory machine-readable storage medium of claim 1, wherein the encoded value is a product of factor values and the instructions for including, by the cryptographic system, the at least one factor value, s, in an encoded value comprise instructions for multiplying, by the cryptographic system, a working value of the encoded value by the at least one factor value, s.

8. The non-transitory machine-readable storage medium of claim 1, wherein the instructions for determining, by the cryptographic system, at least one factor value, s, of the set of factor values, S, corresponding to the given digit, $x_i$, and the instructions for including, by the cryptographic system, the at least one factor value, s, in an encoded value are configured to be executed for each digit in the set of digits, X.

9. The non-transitory machine-readable storage medium of claim 1, wherein:
   the encoded value $$\prod_{i=0}^{R-1} s_i^{x_i}$$

is calculated as $$\prod_{i=0}^{R-1} L[i+1]^{x_i} \bmod N$$

where L[i+1] is an element within a lookup table L located at position i+1 and corresponding to a signature value of at least one factor value, s, in the set of factor values, S,
the signature value corresponds to the at least one factor value, s, raised to the power of an exponent portion of a private key, d, and
N is a modulus portion of the private key.

10. A non-transitory machine-readable storage medium encoded with instructions for verifying a digital signature using a white-box cryptographic implementation in a cryptographic system performing a cryptographic operation, the non-transitory machine-readable medium comprising:
   instructions for receiving, by the cryptographic system, a message, m, and a digital signature from a sending party;
   instructions for verifying, by the cryptographic system, the digital signature through the cryptographic operation by using a signature verification key associated with the sending party to produce a reference signature, a;
   instructions for creating, by the cryptographic system, a message digest, h, based on the received message;
   instructions for encoding, by the cryptographic system the message digest, h, to produce an encoded digest, v, comprising:
      instructions for determining, by the cryptographic system, a set of digits, X, representative of the message digest, h,
      instructions for determining, by the cryptographic system, a set of factor values, S, to be used in generating an encoded value,
      instructions for, for a given digit, x, of the set of digits, X, determining, by the cryptographic system, for a given digit, x, of the set of digits, X, at least one factor value, s, of the set of factor values, S, corresponding to the given digit, x, and
      instructions for including, by the cryptographic system, the at least one factor value, s, in the encoded digest, v;
   instructions for comparing, by the cryptographic system, the reference signature, a, to the encoded digest, v, to determine whether the sending party is authentic, wherein
   the instructions for determining, by the cryptographic system, a set of digits, X, representative of a value to be encoded comprise instructions for, for a value $$x \in \mathbb{Z}/2^n\mathbb{Z}$$

and radix, r, determining a set of digits, $$x_i \in X$$

as $$x = \sum_{i=0}^{R-1} x_i r^i$$

where $$R = \left\lceil \frac{n}{\log_2 r} \right\rceil$$

and $x_i$ is less man r and greater than or equal to zero; and the instructions for determining, by the cryptographic system, at least one factor value, s, of the set of factor values, S, corresponding to the given digit, x, and the instructions for including, by the cryptographic system, the at least one factor value, s, in an encoded value together comprise instructions for calculating, by the cryptographic system, an encoded value as $$\prod_{i=0}^{R-1} s_i^{x_i}$$

where $s_i$ is the factor value at position i within the set of factor values S.

11. The non-transitory machine-readable storage medium of claim 10, wherein the instructions for determining a set of digits, X, representative of the message digest comprise:
   instructions for, determining, by the cryptographic system, for a given radix, r, a radix-r representation of the message digest,
   instructions for wherein the set of digits, X, comprise the digits of the radix-r representation and wherein each digit in the set of digits X is less than the radix, r.

12. The non-transitory machine-readable storage medium of claim 10, wherein:
   the set of factor values, S, is an ordered set, and
   the instructions for determining, by the cryptographic system, at least one factor value, s, of the set of factor values, S, corresponding to the given digit, x, comprise:
      instructions for determining, by the cryptographic system, the factor value, $s_i$, located at a position within the set of factor values, S, that corresponds to the position of the given digit, x, within the set of digits, X.

13. The non-transitory machine-readable storage medium of claim 12, wherein the instructions for determining, by the cryptographic system, at least one factor value, s, of the set of factor values, S, corresponding to the given digit, x, further comprise:
   instructions for raising, by the cryptographic system, the determined factor value, s, to the power of the given digit, $x_i$, to calculate the at least one factor value, s.

14. The non-transitory machine-readable storage medium of claim 10, wherein the encoded digest, v, is a product of factor values and the instructions for including, by the cryptographic system, the at least one factor value, s, in the encoded digest, v, comprise instructions for multiplying, by the cryptographic system, a working value of the encoded digest, v, by the at least one factor value, s.

15. A non-transitory machine-readable storage medium encoded with instructions for signing data using a white-box cryptographic implementation in a cryptographic system performing an encryption/decryption operation, the non-transitory machine-readable medium encoded comprising:
   instructions for receiving, by the cryptographic system, a message, m, from a sending party;
   instructions for producing, by the cryptographic system, a digital signature, for the message, m, including:
      instructions for determining, by the cryptographic system, a set of digits, X, representative of a value to be signed;
      instructions for determining, by the cryptographic system, a set of factor values, S, to be used in generating a signature;
      instructions for, determining, by the cryptographic system, for a given digit, x, of the set of digits, X, at least one factor value, s, of the set of factor values, S, corresponding to the given digit, x;
      instructions for generating, by the cryptographic system, at least one signature factor value, l, equivalent to the at least one factor value, s, raised to the power of a private key, d includes retrieving the at least one signature factor value, l, from a lookup table based on the at least one factor value, s; and
      instructions for including, by the cryptographic system, the at least one signature factor value, l, in an encoded value, and
      instructions for transmitting, by the cryptographic system, the digital signature and the message, m to a receiving party.

16. The non-transitory machine-readable storage medium of claim 15, wherein the instructions for determining, by the cryptographic system, a set of digits, X, representative of a value to be encoded comprise:
   instructions for, determining, by the cryptographic system, for a given radix, r, a radix-r representation of the value to be encoded,
   wherein the set of digits, X, comprise the digits of the radix-r representation and wherein each digit in the set of digits X is less than the radix, r.

17. The non-transitory machine-readable storage medium encoded of claim 15, wherein:
   the set of factor values, S, is an ordered set, and
   the instructions for determining, by the cryptographic system, at least one factor value, s, of the set of factor values, S, corresponding to the given digit, x, comprise:
      instructions for determining, by the cryptographic system, the factor value, $s_i$, located at a position within the set of factor values, S, that corresponds to the position of the given digit, x, within the set of digits, X.

18. The non-transitory machine-readable storage medium of claim 17, wherein the instructions for determining, by the cryptographic system, at least one factor value, s, of the set of factor values, S, corresponding to the given digit, x, further comprise:
   instructions for raising, by the cryptographic system, the determined factor value, s, to the power of the given digit, $x_i$, to calculate the at least one factor value, s.

19. The non-transitory machine-readable storage medium of claim 10, wherein:
   the encoded value $$\prod_{i=0}^{R-1} s_i^{x_i}$$

is calculated as $$\prod_{i=0}^{R-1} L[i+1]^{x_i} \bmod N$$

where L[i+1] is an element within a lookup table L located at position i+1 and corresponding to a signature value of at least one factor value, s, in the set of factor values, S, the signature value corresponds to the at least one factor value, s, raised to the power of an exponent portion of a private key, d, and N is a modulus portion of the private key.

\* \* \* \* \*